US005753825A

United States Patent [19]
Brandt, Jr.

[11] Patent Number: 5,753,825
[45] Date of Patent: May 19, 1998

[54] VELOCITY AVERAGING PITOT

[76] Inventor: Robert O. Brandt, Jr., P.O. Box 5606, Wilmington, N.C. 28403

[21] Appl. No.: 684,708

[22] Filed: Jul. 19, 1996

[51] Int. Cl.$^6$ ............................................ G01F 1/34
[52] U.S. Cl. ............................................ 73/861.66
[58] Field of Search ............................ 73/861.66, 861.65

[56] References Cited

U.S. PATENT DOCUMENTS

| | | | |
|---|---|---|---|
| 3,765,241 | 10/1973 | Lambert | 73/861.66 |
| 4,559,835 | 12/1985 | DeBaun | 73/861.66 |
| 4,735,100 | 4/1988 | Hajto | 73/861.66 |
| 4,768,386 | 9/1988 | Taddeo | 73/861.66 |
| 4,912,973 | 4/1990 | Milewski et al. | 73/861.66 |
| 5,429,003 | 7/1995 | McFarland | 73/861.42 |
| 5,481,925 | 1/1996 | Woodbury | 73/861.66 |

*Primary Examiner*—George M. Dombroske
*Assistant Examiner*—Jewel V. Artis
*Attorney, Agent, or Firm*—Rosenthal & Putterman

[57] ABSTRACT

A fluid pressure sensing apparatus has at least one pressure sensing element that is adapted to extend transverse to the direction of flow of a fluid flow stream. The probe is divided into an upstream chamber and a downstream chamber. A plurality of static pressure measuring holes define openings and are constructed and arranged within the probe so as to extend transversely to the fluid flow direction and further, the static pressure measuring holes are in fluid communication with the downstream chamber. A plurality of total pressure measuring holes define openings and are constructed and arranged within the probe so as to extend through the upstream wall in the direction of fluid flow and further, the total pressure measuring holes are in fluid communication with the upstream chamber, the total pressure measuring holes being located in front of the static pressure measuring holes when considered in the direction of fluid flow. In addition, the static pressure and the total pressure measuring holes have differing geometries that operate to enhance measurement accuracy.

13 Claims, 6 Drawing Sheets

VELOCITY AVERAGING PITOT

FIELD OF THE INVENTION

This invention relates generally to the field of pitots and more particularly to velocity averaging pitots.

BACKGROUND OF THE INVENTION

Pitot tubes have long been used in the measurement of air flow. Pitots measure the total pressure and the static pressure, the difference therebetween being the square of the velocity pressure which is proportional to either the velocity of the pitot moving through the air (such as avionics) or the square of the air velocity moving past the pitot (such as in ductwork, etc.)

The measurement of total pressure is relatively simple. On the surface of any body, regardless of shape, immersed in a stream of fluid there is some point (often the forward most point) at which the fluid is brought to rest and the pressure acting is the total pressure of the undisturbed flow. Thus, the pressure can be determined by providing an orifice at that point and connecting it to a manometer. This is the basis of the classic pitot tube which has been universally adapted for the measurement of total pressure.

Static pressure on the other hand, is comparatively difficult to obtain as the flow at the static orifices should be the same, both in speed and direction, as it was before the measuring instrument was introduced. Thus, in order to avoid, vortices, the static pressure is normally measured from a point which is at least four diameters (but preferably more) away from the leading edge of the measurement device. Nevertheless, it is difficult to produce a pitot that accurately and reliably measures low fluid velocities (50 feet per minute and above) at low cost. In addition, developing a pitot that is accurate at very low velocities as well as high velocities has also proved difficult. In response to the foregoing, the inventor hereof developed a parallel plate pitot which is disclosed in U.S. Pat. No. 5,402,687 entitled Parallel Plate Pitot the subject matter of which is incorporated herein by reference. The foregoing pitot provides the capability of measuring accurately both very low fluid flow rates as well as high fluid flow rates in a single apparatus.

Notwithstanding the foregoing, a continuing problem in the art was the accurate measurement of the total fluid flowing in a given system (such as in ductwork) as in many cases the fluid flow across the diameter was uneven. Thus, system control was often based on inaccurate measurements which resulted in less than optimal control.

With the foregoing in mind, it is an object of the present invention to provide a velocity averaging pitot which advances the art while still reaping the benefits of U.S. Pat. No. 5,402,687.

Another object of the invention is to provide a velocity averaging pitot which is inexpensive and easy to manufacture.

Yet another object of the present invention is to provide a velocity averaging pitot which is accurate at high and low fluid flow velocities and further, which compensates for uneven flow across the fluid flow path.

SUMMARY OF THE INVENTION

The foregoing objects are accomplished by providing a fluid pressure sensing apparatus such as a pitot of the type normally positioned in a stream of moving fluid. The fluid pressure sensing apparatus comprises a probe having at least one fluid pressure sensor element. The pressure sensing element or probe is adapted to extend transverse to the direction of flow of a fluid flow stream and being divided into an upstream chamber and a downstream chamber. A plurality of static pressure measuring holes defining openings extend transversely to the fluid flow direction and the static pressure measuring holes are in fluid communication with the downstream chamber and a plurality of total pressure measuring holes defining openings extend through the upstream wall in the direction of fluid flow and the total pressure measuring holes are in fluid communication with the upstream chamber. At least some of said total pressure measuring holes have geometries that differ from the static pressure measuring holes and thus, the probe accurately measures total fluid flow even when fluid flow within the fluid flow stream is uneven across its width.

BRIEF DESCRIPTION OF THE DRAWINGS

Some of the features and advantages of the invention having been briefly stated, others will appear from the detailed specification which follows, when taken in connection with the accompanying drawings in which.

DETAILED DESCRIPTION OF THE ILLUSTRATED EMBODIMENT

While the present invention will be described more fully hereinafter with reference to the accompanying drawings, in which a particular embodiment is shown, it is to be understood at the outset that persons skilled in the art may modify the invention herein described while still achieving the favorable results of this invention. Accordingly, the description which follows is to be understood as a broad teaching disclosure directed to persons of skill in the appropriate arts and not as limiting upon the present invention.

Referring more specifically to the drawings, the pitot of the present invention is generally indicated at 10 and is preferably fabricated by means of extrusion molding techniques, well known to those skilled in the art. In this manner the pitot may be cut from standard stock so as to fit within vents of any diameter. Once the stock has been cut, the necessary hardware may be connected, as will be explained in greater detail hereinbelow.

Figure 1:
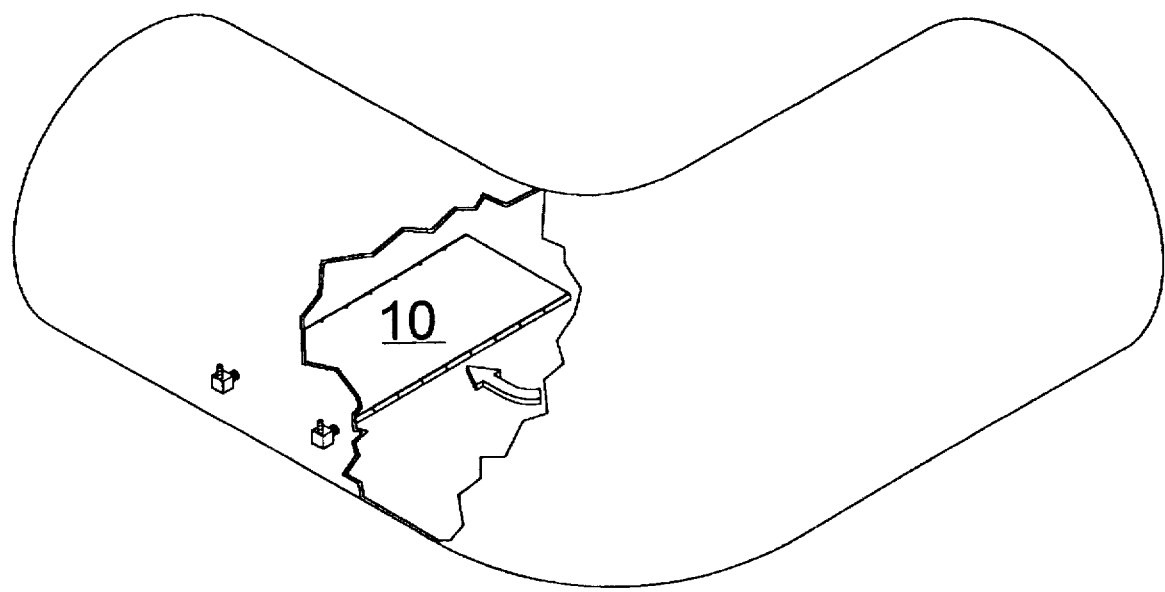
FIG. 1 is a perspective view partially broken away of a duct with the pitot according to the present invention positioned therein.
Figure 2:
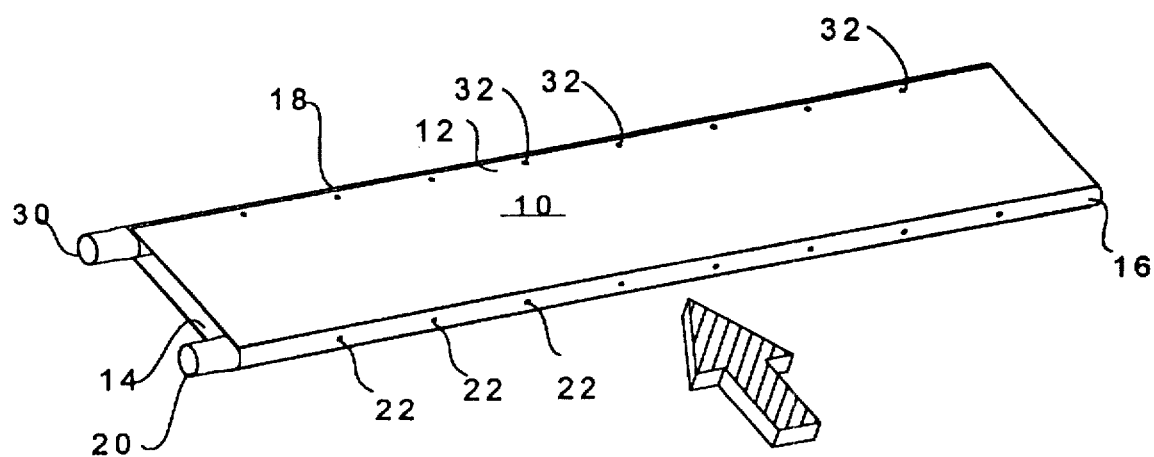
FIG. 2 is a perspective view of a pitot according to the present invention.
Figure 3:
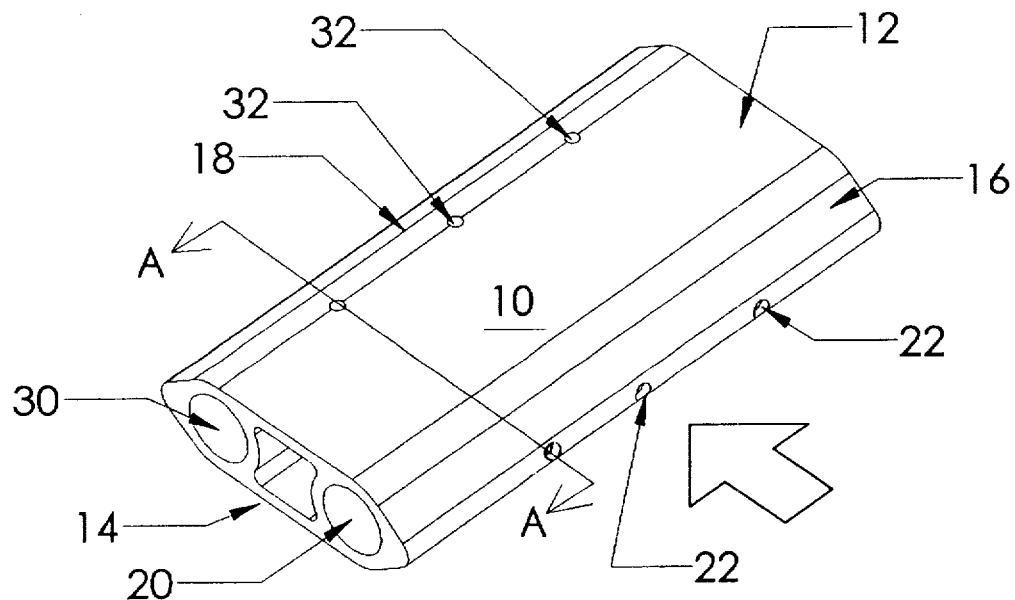
FIG. 3 is a perspective view of a section of the pitot according to the present invention.
Figure 4:
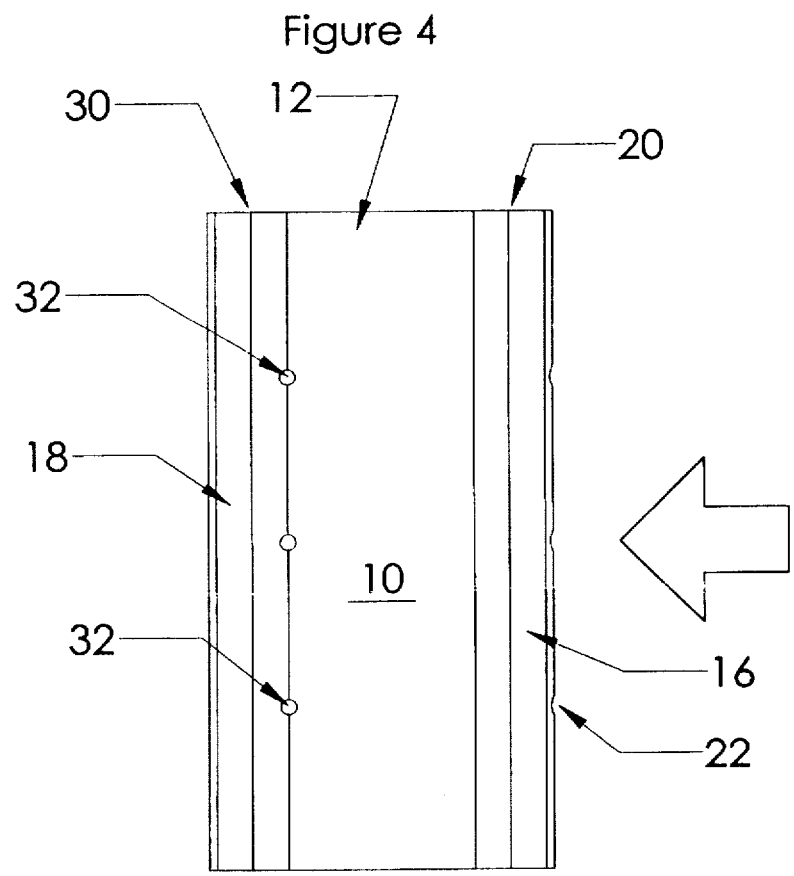
FIG. 4 is a plan view of a section of the pitot according to the present invention.

The pitot 10 comprises an elongate, substantially symmetrical wing-like structure that is of sufficient length to extent across the fluid flow stream or vent into which it is inserted (best illustrated in FIG. 1). In practice, the pitot 10 is inserted transverse to the direction of flow of the fluid flow stream, generally indicated in the figures as an arrow. The pitot 10 has an upper surface 12 and a lower surface 14 both of which are substantially parallel and flat. At the upstream or leading edge 16 (as referenced with respect to that portion of the pitot which comes into contact with the fluid flow stream first) of the pitot 10 is a curved surface that connects the upper and lower surfaces 12, 14, respectively. Similarly, at the downstream or trailing edge 18 is a second curved surface (as referenced with respect to that portion of the pitot which comes into contact with the fluid flow steam last) that connects the upper and lower surfaces 12, 14, respectively.

Figure 5:
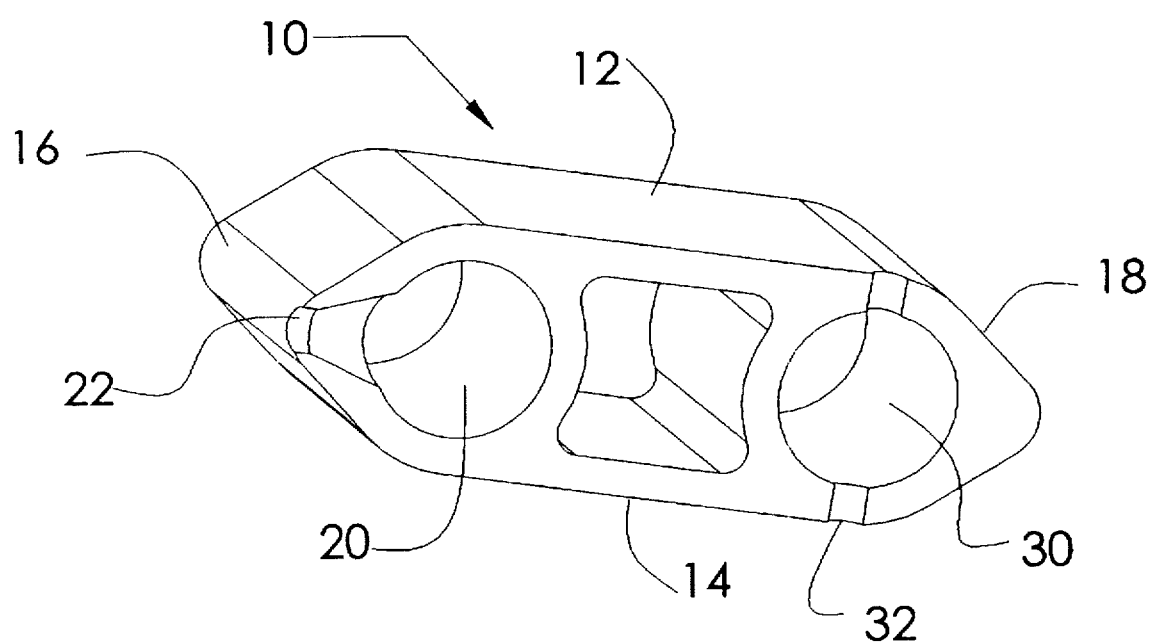
FIG. 5 is a sectional perspective view taken along line A—A of FIG. 3 of the pitot according to the present invention.
Figure 6:
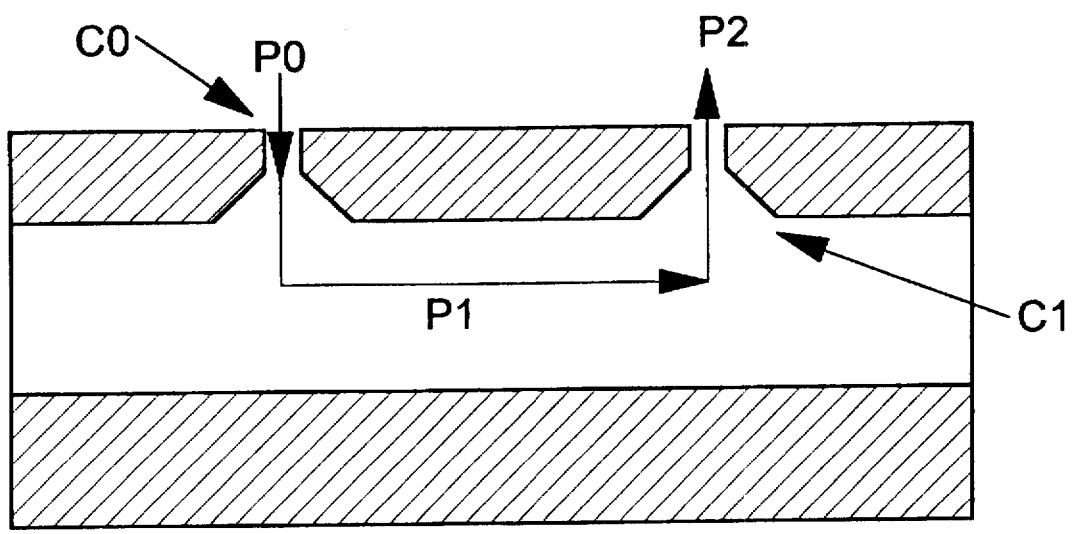
FIG. 6 is a cross section of one chamber of the pitot according to the present invention and illustrating the cone-shaped total pressure openings in the pitot.

A first chamber or tube 20 is formed within the wing-like structure proximate the leading edge thereof also transverse to the fluid flow direction and extends along its length. A plurality of spaced apart total pressure measuring holes or ports 22 extend through the leading edge 16 in the fluid flow direction. As best illustrated in FIGS. 5 and 6 the total pressure measuring holes 22 are chamfered or are "funnel shaped" such that their inner diameter is greater than their outer diameter (the inner diameter being proximate tube 20 and the outer diameter being proximate port 20). In addition, the ends of tube 20 are provided with end caps or outlet ports (not shown).

A second chamber or tube 30 is formed within the wing-like structure proximate the trailing edge thereof also transverse to the fluid flow direction and extends along the length of the wing-like structure. A plurality of spaced apart static pressure measuring holes or ports 32 extend through the trailing edge perpendicular to the fluid flow direction. As best illustrated in FIG. 5, the static pressure measuring holes are of uniform diameter along their length. In addition, the ends of tube 30 are provided with end caps or outlet ports (not shown).

It will be noted that in the figures, the total pressure measurement holes have been modified, the invention will operate just as well when the geometries of the static and total pressure holes is reversed.

In the typical averaging pitot of the prior art, the probe measures pressure, not velocity. In order to be able to average the velocity of two or more points, first one must take the square root of the individual pressure readings and then average these values. Failure to take the square root of the individual pressure readings will result in considerable measurement error.

Figure 7:
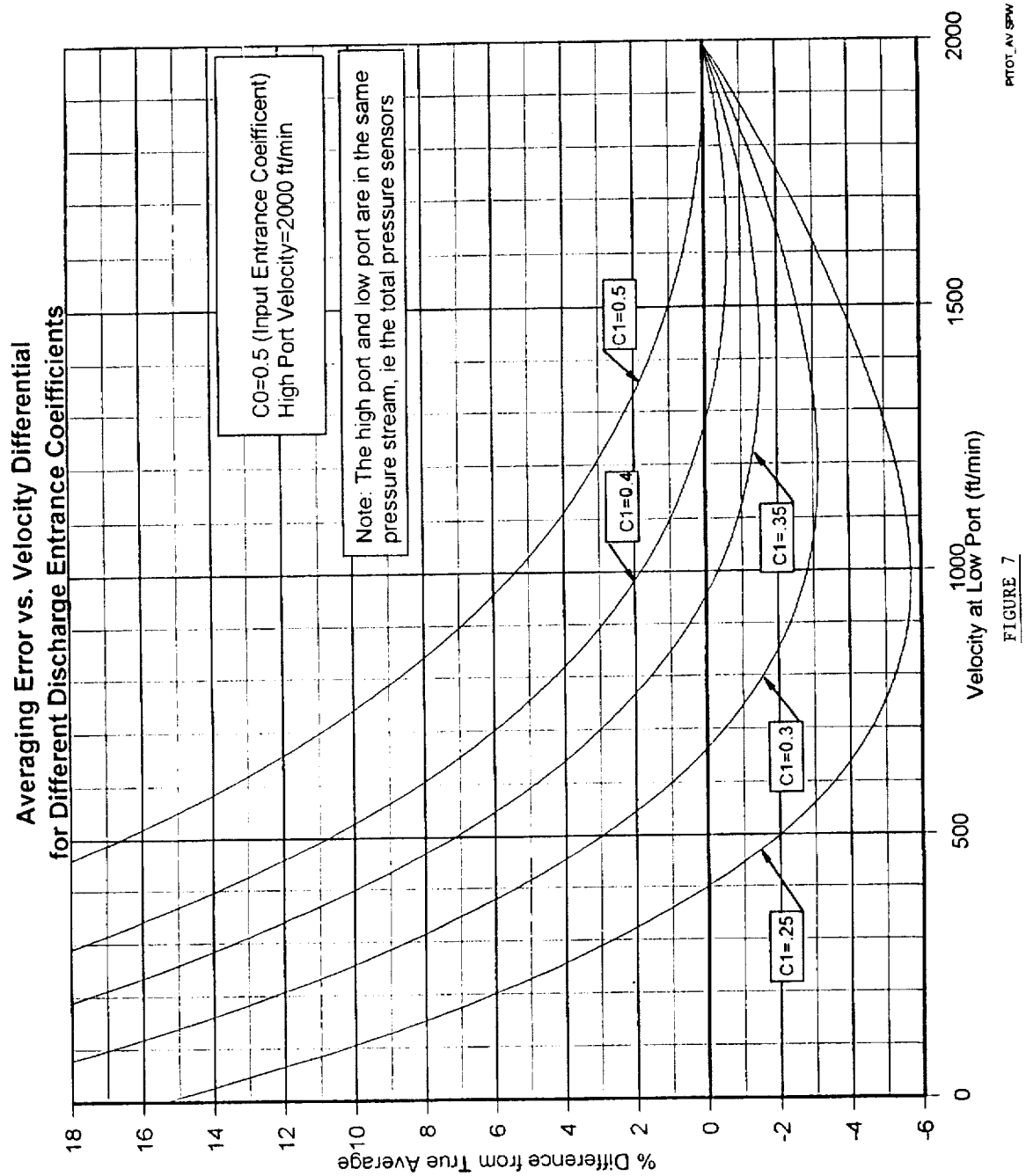
FIG. 7 is a graph illustrating the averaging error versus velocity differential for different discharge entrance coefficients.

The graph of FIG. 7 illustrates the error due to pressure averaging. The line indicated by C1=0.5 is the line which shows the pressure averaging error. This is because both entrance coefficients are the same, namely, 0.5. As used herein the term "entrance coefficient" describes modifying the manner in which a particular port is shaped and not the direction of flow through the port. In the given example, an entrance coefficient of 0.50 means that there has been no modification to the port and that it is merely a cylindrical sharp edged drill hole (i.e., the static pressure hole 32 of FIG. 5). Values smaller than 0.50 indicate that the port has been shaped to cause the fluid flow to encounter less resistance to fluid flow from the shaped side (i.e., the funnel shaped portion of the port). FIG. 7 therefore clearly indicates that at C1=0.5 that averaging errors are always high. However, if one were to change the entrance coefficient so that the discharge coefficient or exit coefficient were always lower, then one would start reducing this error.

Referring again to FIG. 7, with C1=0.35, the error ranges between about 1.5% negative to about 1.5% positive for a velocity range of 2000 feet/minute to 800 feet/minute. Since the errors are opposite, they tend to cancel on another. In the same range, the error of the pitot with the same coefficient on both sides is about 1.5% by about 1400 feet/minute and by 800 feet/minute the error approaches 9%. These errors are all positive so they do not cancel each other out. The foregoing may be expressed mathematically as follows:

$$P0-P1=C0 \times Pvel$$

$$P1-P2=C1 \times Pvel$$

Solving for P1, where Pvel is the throat velocity of the sensing hole and is the same for both holes $$P1 = \frac{C1 \cdot P0 + C0 \cdot P2}{C1 + C0}$$

where P0 and P2 are velocity pressures represented the velocities in FIG. 7.

While the improved pitot design of the present invention permits greater design flexibility and measurement of the fluid flow stream with greater accuracy, the upper and lower surfaces 12, 14 should be parallel and of equal size. Similarly, tubes 20, 30 should also be parallel and of equal diameter. With respect to more detailed design criteria, the pitot 10 should extend across the entire flow stream. Two other dimensions are also important. First, the distance between tubes 20, 30 should be at least about four and preferably eight to ten times the tube diameter and second, the plate depth (the distance between tubes) should be at least one-half the duct diameter. For example, assume the pitot is to be placed across a ten inch diameter duct. Thus, the distance between tubes 20, 30 should be at least five inches. Also, as stated, the ratio between the tube diameter and the plate length is preferably eight to ten times the tube diameter, thus making the tube diameter between about 0.625 and 0.50 inches. In addition, the ratio of pitot frontal area should be greater than five percent and less than fifty percent of the cross sectional area of the duct (or airfoil) into which it is placed and for most applications would be about ten percent for accurate performance because when the flow is channelled into a more known pattern, by restricting the cross-sectional area of flow, the velocity of the flow stream becomes more predictable.

In operation, the pitot 10 is enclosed by appropriate means within the duct. A fluid flow passes over the pitot and at one end of the first tube 22, the total pressure reading is taken and at one end of the second tube 32, the static pressure reading is taken. The foregoing outputs are then usually output to a pressure comparator to determine the velocity pressure which is the difference between the total pressure and the static pressure.

It will be noted that while the drawings illustrate a parallel plate pitot, the concept of having the total pressure openings and the static pressure openings differing from one another may be extended and applied to any type of pitot or fluid flow measuring technique such as single row averaging, x-pitot designs, or for any arrangement of multiple points in a gas stream. Thus, the foregoing embodiments and examples are to be considered illustrative, rather than restrictive of the invention, and those modifications which come within the meaning and range of equivalence of the claims are to be included therein.

That which is claimed is:

1. A fluid pressure sensing apparatus comprising at least one fluid pressure sensor element, said fluid pressure sensing element comprising:

an elongate probe adapted to extend transverse to the direction of flow of a fluid flow stream, said probe being divided into an upstream chamber and a downstream chamber;

a plurality of static pressure measuring holes defining openings constructed and arranged within said probe and extending transversely to the fluid flow direction and further wherein said static pressure measuring holes are in fluid communication with the downstream chamber;

a plurality of total pressure measuring holes defining openings constructed and arranged within said probe and extending through the upstream wall in the direction of fluid flow and further wherein said total pressure measuring holes are in fluid communication with the upstream chamber, said total pressure measuring holes being located in front of the static pressure measuring holes when considered in the direction of fluid flow;

and further wherein at least some of said total pressure measuring holes have have an exit coefficient that is lower then the entrance coefficient;

whereby the fluid pressure sensing apparatus accurately measures total fluid flow even when fluid flow within the fluid flow stream is uneven across its width.

2. A fluid pressure sensing apparatus according to claim 1 wherein one of said respective sets of pressure measuring holes include holes at least a plurality of which have inner diameters that are greater than the outer diameters thereof.

3. A fluid pressure sensing apparatus according to claim 1 wherein one of said respective sets of pressure measuring holes include holes at least a plurality of which are funnel shaped such that the inner diameter of said holes is greater that the outer diameters thereof.

4. A fluid pressure sensing apparatus according to claim 1 wherein one of said respective sets of pressure measuring holes are chamfered.

5. A fluid pressure sensing apparatus according to claim 4 wherein the total pressure measuring holes are chamfered so that the diameter of the holes increases in the direction of air flow.

6. A fluid pressure sensing apparatus according to claim 4 wherein the static pressure measuring holes are chamfered so that the diameter of the hole decreases in the direction of air flow.

7. A fluid pressure sensing apparatus according to claim 1 wherein said fluid pressure sensing apparatus comprises a parallel plate pitot.

8. A fluid pressure sensing apparatus according to claim 1 wherein said fluid pressure sensing apparatus comprises an orifice plate.

9. A fluid pressure sensing apparatus according to claim 1 wherein said fluid pressure sensing apparatus comprises a venturi tube.

10. A fluid pressure sensing apparatus according to claim 1 wherein said fluid pressure sensing apparatus comprises an x-pitot.

11. A fluid pressure sensing apparatus according to claim 1 wherein said fluid pressure sensing apparatus comprises a flow nozzle having high an low port averaging.

12. A fluid pressure sensing apparatus comprising at least one fluid pressure sensor element, said fluid pressure sensing element comprising:

an elongate probe having a pair of spaced substantially flat surfaces, said probe adapted to extend transverse to the direction of flow of a fluid flow stream and being divided into an upstream chamber and a downstream chamber, and further wherein said probe includes respective symmetrical leading and trailing edges connecting the respective flat surfaces;

a plurality of static pressure measuring holes defining openings constructed and arranged within said trailing edge and extending transversely to the fluid flow direction and further wherein said static pressure measuring holes are in fluid communication with the downstream chamber;

a plurality of total pressure measuring holes defining openings constructed and arranged within said leading edge and extending through the upstream wall of said leading edge in the direction of fluid flow and further wherein said total pressure measuring holes are in fluid communication with the upstream chamber, said total pressure measuring holes being located in front of the static pressure measuring holes when considered in the direction of fluid flow and being chamfered such that the diameter of said total pressure measuring holes increases in the direction of fluid flow;

whereby the fluid pressure sensing apparatus accurately measures total fluid flow even when fluid flow within the fluid flow stream is uneven across its width.

13. A fluid pressure sensing apparatus comprising at least one fluid pressure sensor element, said fluid pressure sensing element comprising:

an elongate probe having a pair of spaced substantially flat surfaces, said probe adapted to extend transverse to the direction of flow of a fluid flow stream and being divided into an upstream chamber and a downstream chamber, and further wherein said probe includes respective symmetrical leading and trailing edges connecting the respective flat surfaces;

a plurality of static pressure measuring holes defining openings constructed and arranged within said trailing edge and extending transversely to the fluid flow direction and further wherein said static pressure measuring holes are in fluid communication with the downstream chamber, said static pressure measuring holes being chamfered such that the diameter of the hole decreases in the direction of fluid flow;

a plurality of total pressure measuring holes defining openings constructed and arranged within said leading edge and extending through the upstream wall of said leading edge in the direction of fluid flow and further wherein said total pressure measuring holes are in fluid communication with the upstream chamber, said total pressure measuring holes being located in front of the static pressure measuring holes when considered in the direction of fluid flow and being chamfered such that the diameter of said total pressure measuring holes increases in the direction of fluid flow;

whereby the fluid pressure sensing apparatus accurately measures total fluid flow even when fluid flow within the fluid flow stream is uneven across its width.

* * * * *